United States Patent Office 3,438,328
Patented Apr. 15, 1969

3,438,328
MAGNETIC TORQUE TRANSMISSION DEVICE
Nikolaus Laing, 35–37 Hofener Weg,
7141 Aldingen, Germany
Continuation-in-part of application Ser. No. 509,714,
Nov. 26, 1965. This application Nov. 27, 1967, Ser.
No. 685,931
The portion of the term of the patent subsequent to
Nov. 28, 1984, has been dedicated to the Public
Int. Cl. F04d 13/06; H02k 5/10
U.S. Cl. 103—87                                  9 Claims

ABSTRACT OF THE DISCLOSURE

A magnetic torque transmission device having a first magnetic member having a spherical inner surface and a second magnetic member having a spherical outer surface mounted with respect to each other so that the axis of the second member intersects the axis of the first member at a fixed point and so that said first member will have a limited universal movement about said fixed point.

Cross-reference to related application

This application is a continuation-in-part of my co-pending application Ser. No. 509,714, filed Nov. 26, 1965, now Patent No. 3,354,833.

Background of the invention

The invention relates to devices for the magnetic transmission of torque. An example of such a device is a machine having a first driving element comprising a magnet or a magnetisable member for generating a rotating magnetic field and, in spaced and coaxial relationship thereto, a second element comprising a magnet or a magnetisable member with angularly disposed permanent or induced poles of alternate polarities.

Known magnetic machines, such as magnetic clutches or electric motors, can be classified into two groups, radial gap machines, and axial gap machines.

It is a drawback of the radial gap machines that the driven element is not magnetically located in an axially stable position and that axial location must be provided by mechanical bearings, a necessity which in the construction of pumps for instance necessitates the provision of bearings for both radial and axial loading.

The axial gap machines have the drawback that the axial thrust which the bearings of the driven element must support are very high and that even a slight relative tilt of the magnetic planes or unequal magnetisation of the two elements generates very high reactive loads in the bearings (edge pressure) which necessitates either the provision of bearings of considerably larger dimensions than would otherwise be necessary or causes early failure of the bearings.

In the axial magnetic couplings hitherto used in the construction of pumps, two coupling elements have been provided in the form of two permanent magnets separated by a rigid parting wall. The two coupling elements are each journalled on stub shafts attached to the parting wall. However, the slightest asymmetry of either the mechanical or the magnetic forces between the two coupling elements submits the journal bearings to high one-sided loads and one-sided wear causes the bearings to wear laterally, a result which then accentuates the off-center effects.

The object of the present invention is the provision of a magnetic machine in which the radial forces engendered in the bearings of the driven element are reduced.

Another object of the invention is the provision of a simple device for the magnetic transmission of torque, comprising bearings which can be easily assembled, in which bearing friction is slight, and which cannot be choked by fouling.

Another object of the invention is the provision of a magnetic machine, such as a magnetic coupling, in which the parting wall has a form which by virtue of its shape can support considerable pressures.

Furthermore, the invention proposes to reduce the axial and radial bearing loads to a minimum.

It is another object of the invention to provide a pump, principally intended for the circulation of warm water in heating or consumer installations for water, which is associated with a magnetic machine according to the invention.

According to the present invention there is provided a magnetic machine or coupling comprising means for generating a rotating magnetic field including a first ferromagnetic member defining an axis and exterior surfaces thereabout, a second ferromagnetic member defining an axis and interior surfaces thereabout, means mounting the second member so that its axis intersects the axis of the first member in a fixed point and so that it can rotate about its axis relative to the first member and have limited universal movement about said fixed point and so that said interior and exterior surfaces are located for passage of magnetic flux between them.

Since the bearing upon which the second magnet or magnetisable member is mounted is set at the center of the sphere defined by the spherical surface of the second magnet or magnetisable member, it assumes a stable position about said center in relation to the first magnet or magnetisable member. In this position the symmetry axes of revolution of both magnets or magnetisable members coincide, and no tilting moments about said center in planes containing the symmetry axes of the revolution are applied by the first magnet or magnetisable member to the second magnet or magnetisable member. In this position furthermore, the radial magnetic forces at the center nullify each other. The second magnet or magnetisable member is mounted so that it can tilt through a small angle about this center of symmetry defined by the clearance in the bearings. A feature of the invention resides in the provision of a point bearing for the driven element at the center of symmetry in which all radial reactive bearing forces are zero and wherein only axial support for the element is required which is simultaneously radially self-centering. Such an effect can be obtained for instance by providing a fixed hemispherical member supporting a rotating likewise hemispherical socket of approximately the same radius. The driven element or the second magnet or magnetisable member can thus be mounted in a bearing which is required to carry no radial loads and only minor axial loads.

The axial loads on the bearing may be adjusted by varying the distance between the two circles which contain the loci of the centers of action of the magnetic forces of both magnets and their distances from the center of symmetry. These distances are so chosen that when the driven element tilts out of the position of symmetry sufficiently large restoring moments are generated for restoring the driven element to the position of symmetry, whilst ensuring that an axial force of sufficient magnitude will be operative in any possible position of tilt of the driven element for keeping the driven element in engagement with the supporting bearing in the presence of any other forces that may arise in operation, such as the axial thrust of a pump impeller. By using such a bearing, pumps can be provided which cannot possibly foul, because any particle of dirt entering the bearing will temporarily force the two bearing members axially apart until the particle of dirt has been ejected.

Suitable materials for the revolving member of the bearing according to the invention are sapphire, sinter corundum or sinter carbide.

Both elements may have the form of permanent magnets with circularly disposed pole segments of alternating polarities. When used in conjunction with an electric motor the driven element may alternatively have the form of a soft iron ring with induced poles. The driving element in such a case is an electromagnet. Finally, one of the two elements may be an eddy current rotor and the driven element may start up at a slower speed than the driving element.

The invention will now be further described by way of example with reference to several embodiments shown in the accompanying drawings.

Description of the preferred embodiments

Figure 1:
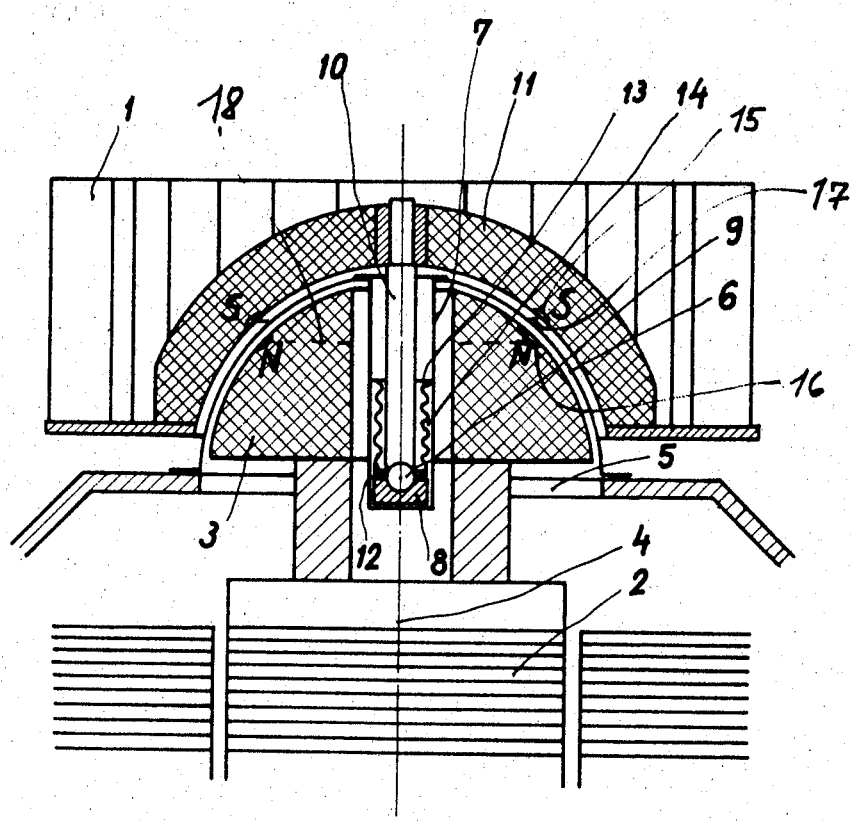
FIG. 1 is a cross-sectional view of a magnetic coupling constructed according to the invention connecting a fan of a hermetically sealed compressor with a drive motor.

Referring to FIG. 1, there is illustrated a magnetic coupling connecting a fan wheel 1 of a hermetically sealed compressor used in, for example, a refrigeration device with an armature 2 of the compressor motor. The armature in turn is connected to a hemispherically shaped annular magnet 3 and both the armature and magnet are freely rotatable about the axis 4. The casing surrounding the armature has an aperture 5 therein having a diameter greater than that of the magnet 3. The aperture 5 is covered over by a stainless steel separation wall 6.

A tube 7 is connected to the wall 6 and is closed at its opposite end to support a bearing member 8 comprising a ball 9 affixed to stub-shaft 10. The opposite end of the shaft is connected to a further hemispherically shaped magnet 11 such that the axis of both magnets intersect at a fixed point on axis 4, the fixed point being the center of the ball 9.

A sealing ring 12 is provided to seal the ball 9 from the ambient space between the two magnets and connects in turn with a bellows 13. The space 14 between the bellows and tube may be filled with a lubricant to minimize friction between the parts. The bellows in addition to providing a containing wall for the lubricant serves to urge the seal into close sliding contact with the ball.

The annular magnets 3 and 11 are each made up of a plurality of pole segments equally disposed about the axis 4. The pole segments of the upper magnet 11 have their region of maximum magnetic field density 15 extending on the inner hemispherical surface of the magnet in a plane 17. The pole segments of the lower magnet 3 have their region of maximum magnetic field density extending on the outer hemispherical surface of the magnet in a plane 18 positioned below plane 17.

As seen from the drawing, the armature is drivingly connected to the fan by the magnetic forces between the two magnets and at the same time, the armature and the magnets connected therewith may move relative to the fan and its magnet in a universal direction about the fixed point at the center of the ball 9.

Figure 2:
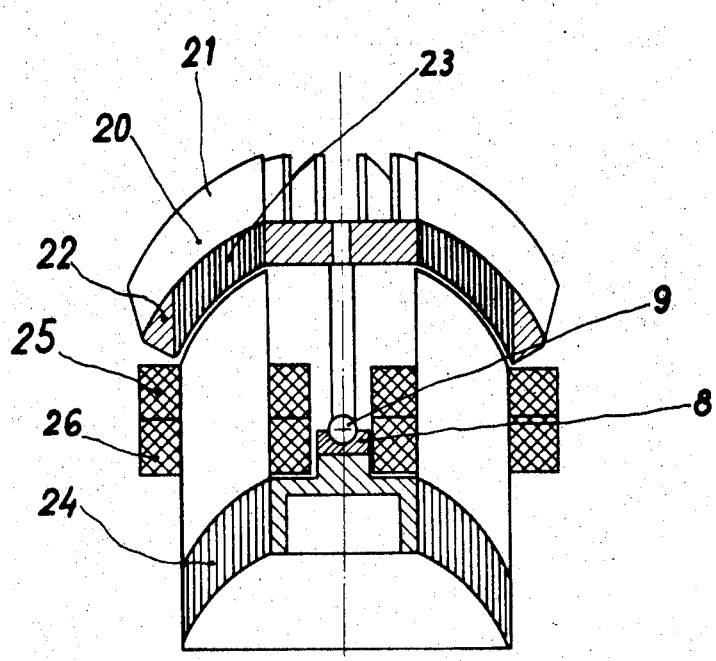
FIG. 2 is an axial sectional view of a different embodiment of the invention.

Reference is made to FIG. 2 where a form of the invention is shown applied to a motor where the stator may move in a universal direction relative to an armature. Here the rotor 20 comprises blower blades 21 and the armature connected to the blades comprise aluminum leads 22 and an iron core formed by a spiral of sheet metal 23. The armature is supported by a bearing member 8 and a rotating ball 9 in the same manner as the device in FIGURE 1.

The rotating magnetic drive field for rotating the armature is created by the stator 24 also formed of a spiral of sheet metal strip. Coils 25 and 26 acting with the stator generate the rotating driving force for rotating the rotor 20.

The construction of FIG. 2, as that of FIG. 1, allows universal movement of the magnetic member having the exterior hemispherical surfaces about a fixed point and with respect to the other magnetic member having the internal hemispherical magnetic surfaces.

I claim:

1. A magnetic machine or coupling comprising means for generating a rotating magnetic field including a first ferromagnetic member defining an axis and exterior surfaces thereabout, a second ferromagnetic member defining an axis and interior surfaces thereabout, means mounting the second member so that its axis intersects the axis of the first member in a fixed point, so that relative to the first member it can rotate about its axis and have limited universal movement about said fixed point and so that said exterior and interior surfaces are located for passage of magnetic flux between them, said members each comprising an equal number of pole segments of alternating polarity forming said surfaces and having centers of magnetic action lying in a plane normal to the respective axis of rotation, the planes of both members lying to the same side of the fixed point with that of the first member nearer thereto than that of the second member.

2. A magnetic machine or coupling as claimed in claim 1, wherein said first and second ferromagnetic members each comprise a plurality of equiangularly disposed magnetic segments, whereof adjacent segments have alternative polarities.

3. A magnetic machine or coupling as claimed in claim 1, wherein said member comprises the stator of an electric motor.

4. A magnetic machine or coupling as claimed in claim 1, wherein said second member has a surface defining a spherical segment.

5. A magnetic machine or coupling as claimed in claim 4, wherein said first member has an external surface spaced from said second member and defining a corresponding spherical segment.

6. A magnetic machine or coupling as claimed in claim 1, wherein said second member is mounted on a radially self-centering pivot bearing.

7. A magnetic machine or coupling as claimed in claim 1, wherein said second member is mounted on a substantially hemispherical pivot.

8. A magnetic machine or coupling as claimed in claim 7, wherein said second member includes a bearing socket defining a segment of a sphere for co-operation with said hemispherical pivot.

9. Refrigeration means including a magnetic coupling as claimed in claim 1, comprising an electric motor including a shaft, said first member being mounted on said shaft and said second member including fan means mounted thereon.

References Cited

UNITED STATES PATENTS

| | | | |
|---|---|---|---|
| 1,568,304 | 1/1926 | Williams | 310—104 |
| 2,810,349 | 10/1957 | Zozulin. | |
| 3,139,832 | 7/1964 | Saunders. | |

ROBERT M. WALKER, *Primary Examiner.*

U.S. Cl. X.R.

310—104